United States Patent [19]

Böhmer et al.

[11] 4,103,080
[45] Jul. 25, 1978

[54] AUXILIARY AGENT FOR IMPROVING RETENTION, DRAINAGE AND TREATMENT ESPECIALLY IN PAPERMAKING, AND USE OF THE AUXILIARY AGENT

[75] Inventors: Branislav Böhmer; Lutz Hoppe, both of Walsrode, Germany

[73] Assignee: Wolff Walsrode Aktiengesellschaft, Walsrode, Germany

[21] Appl. No.: 729,852

[22] Filed: Oct. 4, 1976

[30] Foreign Application Priority Data

Oct. 8, 1975 [DE] Fed. Rep. of Germany ....... 2545007

[51] Int. Cl.$^2$ .................. C08F 2/10; C08F 120/56
[52] U.S. Cl. .................... 526/303; 526/73; 526/81; 526/86
[58] Field of Search .............. 526/73, 81, 86, 303

[56] References Cited

U.S. PATENT DOCUMENTS

| 2,983,717 | 5/1961 | Henley et al. | 526/73 |
| 3,086,950 | 4/1963 | Renner | 526/303 |
| 3,242,152 | 3/1966 | Goren | 526/303 |
| 3,332,922 | 7/1967 | Hoover | 526/303 |
| 3,336,269 | 8/1967 | Monagle et al. | 526/303 |
| 3,663,518 | 5/1972 | Patzelt et al. | 526/303 |
| 3,968,093 | 7/1976 | Hasegawa et al. | 526/303 |
| 3,969,329 | 7/1976 | Hirata et al. | 526/303 |

FOREIGN PATENT DOCUMENTS 1,106,573  3/1968  United Kingdom ............. 526/303

Primary Examiner—Alan Holler
Attorney, Agent, or Firm—Connolly and Hutz

[57] ABSTRACT

Auxiliary agents for improving the retention of flushable solids and for accelerating the drainage of suspensions, for more rapid treatment of solid and liquid substances which can be utilized industrially, such as industrial water, effluents and sludges, inter alia in the paper industry, and for improving the structure of soils, this auxiliary agents being in the form of suitable high-molecular, water-soluble acrylamide polymers obtained by solution polymerization, and also relates to a process for the preparation of this auxiliary agents.

6 Claims, No Drawings

AUXILIARY AGENT FOR IMPROVING RETENTION, DRAINAGE AND TREATMENT ESPECIALLY IN PAPERMAKING, AND USE OF THE AUXILIARY AGENT

PRIOR ART

Auxiliary agents of the abovementioned type, their preparation and their use have long been known in principle.

As has long been known to those skilled in the art, products which have a particularly good flocculation, retention and drainage capacity must have the structure of a particularly high-molecular, linear polymer with as little branching and crosslinking at, or between, the molecule chains as possible, so that the maximum retention and drainage capacity is linked with an extremely high solubility in water. Precisely this combination of the two abovementioned properties presents a problem which to the present day has not yet been solved in an optimum manner, because, due to their preparation, particularly high-molecular products frequently exhibit branching and crosslinking, which necessarily is associated with a reduction in the solubility in water, which, depending on the particular macromolecular structure, can go as far as insolubility in water. However, products which are insoluble in water cannot be employed in an optimum manner in the abovementioned sense.

As time has gone by, in order to avoid this disadvantage and in place of the difficulties which have arisen mainly in the case of solution polymerisation, products have been prepared according to the precipitation polymerisation process, in which the products precipitate from the medium after a certain chain growth and the time of the precipitation can be dependent on the medium. However, no further chain growth takes place after precipitation, so that the time of precipitation and thus the time at which the chain growth is ended must also be determined by the nature of the medium.

Although products which are readily soluble in water are indeed obtained, depending on the choice of the medium, by means of precipitation polymerisation, these products by no means have an optimum chain length, with regard to the maximum possible retention and drainage capacity of polyacrylamide polymers.

Even very specific additives to these media have to date not provided auxiliary agents prepared according to the precipitation polymerisation process, which exhibit both an extremely high molecular weight, and thus an optimum retention and drainage capacity, and also despite this very high molecular weight, exhibit good solubility in water.

For these and other reasons, solution polymerisation has again been preferred recently, although the chain crosslinking and the insolubility in water in this case represent disadvantages and problems which have not yet been solved completely satisfactorily.

Auxiliary agents which are based on high-molecular, watersoluble acrylamide polymers and which are prepared by the solution polymerisation process have in themselves been known for a long time.

Thus, a process for the preparation of high-molecular polymerisation products, which are soluble in cold water, in the form of acrylamide polymers, in which process acrylamide is polymerised in water or in polyhydric alcohols or in mixtures thereof with water, is already known from DT-RS 697,481. However, the molecular weight of the products which can be obtained in this way is not sufficiently high that it is possible to achieve an optimum retention and drainage capacity on appropriate use of these products as auxiliary agents, for example in the paper industry. In the 35 years which have gone by since the above patent application was disclosed, those skilled in the art have recognised that the reason for this is, inter alia, that a certain pH in the solution is a precondition for obtaining high-molecular acrylamide polymer products and therefore, due to the lack of pH data in the abovementioned publication those skilled in the art cannot be given reliable guidelines for the technical procedure. Where instructions of a different type are given, as on page 2, line 17 of this printed publication, according to which, for example, the degree of polymerisation which can be achieved with the aid of the known process is higher the less water is employed for the solution polymerisation, these instructions have been overtaken by the more recent progress in the art in as much as those skilled in the art have found out that when the concentration of the starting monomers to be polymerised in water as the solvent is relatively high it is possible to achieve only relatively low molecular weights.

The statement on page 2, line 13 of the abovementioned patent specification that the optimum polymerisation temperature is about 60° to 70° C has also since been recognised to be inadvisable, because the polymerisation initiator decomposes more rapidly the higher the polymerisation temperature and this results in too many polymer chains starting to form simultaneously, the end effect of which is that too many chains which are too short are produced, and thus auxiliary agents with an inadequately high molecular weight are formed.

U.S. Pat. No. 2,486,190 which has also been known since 25.10.1949 is mainly concerned with reducing the danger of the formation of acrylamide polymers which have the disadvantage of being insoluble in water or of being too sparingly soluble in water. A restriction in the chain length by the addition of aliphatic alcohols is recommended as a solution to this problem. The desired solubility in water is then indeed achieved in this way, but at the expense of the size of the molecular weight and thus at the expense of the retention and drainage capacity of the auxiliary agents thus formed.

The technical teaching that polymerisation of acrylamide monomers in aqueous solution does indeed lead to products which have a higher molecular weight than when the polymerisation is carried out in a solution consisting of a mixture of water and alcohols can be seen from U.S. Pat. No. 2,486,191, which was also published on 25.10.1949, but it is finally suggested to those skilled in the art that the mixture of alcohol and water is to be preferred as the solvent medium because, according to this state of the art, it is more important to obtain water-soluble products than high-molecular compounds. In any case, by applying this technical teaching, the average person skilled in the art is not able to obtain products which are both completely soluble in water and exhibit an extremely high molecular weight.

Another interesting route for the preparation of high-molecular, water-soluble acrylamide polymers can be seen from U.S. Pat. No. 2,820,777, which was published on 21.1.1958. In this case acrylamide is reacted in aqueous solution at a temperature of 50° to 100° C in the presence of a polymerisation catalyst and of an alkali metal hydroxide, the alkali metal hydroxide being present in amounts of between 0.01 to 1 and about 0.25 to 1 mol per mol of the acrylamide. The simultaneous polymerisation and hydrolysis of the acrylamide within the framework of a single preparation stage is interesting. Methyl alcohol, ethyl alcohol, isopropyl alcohol and thioglycol, as well as their derivatives, are mentioned, inter alia, as chain stoppers or polymerisation regulating substances. Since it is alleged that acrylamide polymers with molecular weights of up to 2 million and above can be achieved according to this process (column 3, line 54 of this US-PS) this product was reproduced (compare Examples 27 to 29 in the text of this application).

It was found that the bulk of the finished product is indeed readily soluble in water and displays polyelectric properties. However, the molecular weight is too low and, moreover, it was not possible to obtain complete solubility in water because acrylamide polymers were present as insoluble gel particles in the finished product and this, apart from the relatively low molecular weight, reduced the usefulness of the product.

In addition, reproducing the process showed that the proportion of constituents which only swell in water or are even insoluble in water increased rapidly in the products as the molecular weight became increasingly higher than 2 million.

The further development of the state of the art which is relevant here can be followed easily with the aid of the patent application, published as DT-AS (German Published Specification Nos.) 1,068,013 on 29.10.1959, for a process for the preparation of concentrated aqueous polyacrylic acid amide solutions since a further development can be seen in this specification in so far as polymerisation regulators, essentially in the form of copper compounds, are added to the monomers, apparently in order to avoid the production of partially insoluble polymeric products, by which means products which are completely soluble in water are indeed to be obtained, but this is again achieved at the expense of the molecular weight. Since, according to column 3, line 22 of this DT-AS (German Published Specification), it is intended to use the products thus produced as hair fixatives, especially as a film substance, there is no necessity at all for the very high molecular weight, which is necessary for auxiliary agents with a particularly good retention and drainage capacity. In this case a different problem leads to a different solution, which, for the abovementioned reason, cannot be employed for the production of auxiliary agents of the type mentioned, for, for example, the paper industry.

For those skilled in the art, a considerable advance over the state of the art discussed hitherto is to be seen from U.S. Pat. No. 3,002,960, which was published on 3.10.1961, to the extent that acrylamide polymer products which are at the same time readily soluble in water and of a relatively high molecular weight are obtainable here for the first time. According to the abovementioned US-PS, however, this object is only achieved when, in accordance with the main patent claim of this specification, the rate of decomposition of a peroxide initiator is accelerated by the addition of a mixture of water-soluble tertiary amines. The danger, which in itself again arises here, that too many polymerisation chains will be started simultaneously by the accelerated decomposition of the initiator and thus molecular weights which are too low will be obtained per chain formed is countered by the recommendation, made to those skilled in the art, in column 6, lines 41 to 43, that optimum values are achieved only when the initiator concentrations are very low (0.04 to 0.1% by weight). Since, in the meantime, it is known from more recent work that even higher molecular weights are obtained when no decomposition accelerators are added to very small concentrations of initiator, a process of preparation further developed in this way has been reproduced, in the form of comparative Example No. 19 given further below, with the result that, even at the optimum pH (12.5) and a very small addition of catalyst (a total of only 0.04% by weight), which was, moreover, even made in two stages, and at an optimum temperature of 50° C and the long reaction period of 22 hours which also leads to optimum results, a molecular weight of 27.7 million, which is outstandingly high for these conditions, was indeed achieved, but, despite all the abovementioned process improvements, the resulting end product showed local gelling and thus contained gel particles which only retained a limited function or were no longer capable of functioning at all and thus became useless.

This means that, with knowledge of the technical teaching which can be taken from the abovementioned U.S. Pat. No. 3,002,960, even in combination with the additional state of the art which has been disclosed after 1961 and is to be applied here, those skilled in the art are not able to obtain substances which display, as indispensable prerequisites for their optimum capacity, complete solubility in water in combination with a particularly high molecular weight.

Moreover, those skilled in the art are restrained from using the technical teaching which can be taken from this US-PS by the fact that this specification recommends chemical compounds for suppressing hydrolysis, which compounds, on the basis of subsequent findings according to DT-OS (German Published Specification No.) 2,050,988, which is discussed further below as state of the art, are designated, in the latter specification, as agents which limit the chain length. The possible choices given to those skilled in the art by these guidelines for technical procedure are either to accept a restriction in the chain length of the product when the substance which suppresses hydrolysis is employed or, alternatively, when this substance is omitted, to obtain the unfavourable hydrolysed products which then arise.

Overall, it can be seen from this that it is inappropriate to follow further the route indicated in particular by this U.S. Pat. No. 3,002,960.

Since the troublesome formation of gel particles, which arises again and again from the state of the art discussed, hitherto, and especially also from the last-mentioned printed prior publication, must be prevented, subsequent printed prior publications, such as, for example, also DT-AS (German Published Specification No.) 1,182,829 published on 3.12.1974, take up this problem again and recommend the addition of aliphatic amines and/or ammonia to the reaction mixture as a solution to this problem.

The function of amines as accelerators for the decomposition of initiators has already been disclosed in the abovementioned US-PS. In that specification, as here, the amines had the same adverse effect. Indeed, the low viscosities of only 34 cP in the examples show that it is not possible to obtain extremely high molecular weights in this way. On the other hand, the alternative use of ammonia, in place of amines, in this DT-AS (German Published Specification) disclosure is new. Most of the examples also relate to the use of ammonia. Since, in the meantime, those skilled in the art know, how important it is to maintain a specific pH range in order to obtain acrylamide polymers which are readily soluble in water and of a very high molecular weight, they will be able to undertake the use of ammonia only if extensive pH controls are carried out at the same time or when the recommendation, which can be taken from the examples of this DT-AS (German Published Specification), that the polymerisation is carried out only under reflux is employed, because otherwise some of the readily volatile ammonia would escape and, because of the continual displacement of the pH associated therewith, an uncontrolled course of reaction could result. Moreover, according to this DT-AS (German Published Specification) the danger of volatility also exists in the case of the amines since it is expressly recommended, in column 3, lines 5 et seq., to use volatile amines with a boiling point below 105° C. Homogeneous acrylamide polymers which have a very high molecular weight and, at the same time, are readily soluble in water, cannot be obtained in this way.

Initially, the same also applies to the addition of ammonia mentioned in U.S. Pat. No. 3,200,098. However, since it can be seen from this US-PS that the addition of ammonia leads to the desired higher molecular weights, the disadvantages of the addition of ammonia, which were already known at the time of the publication of the abovementioned US-PS (10.8.1965), are accepted because, at this point in time, there is apparently no more suitable chemical compound, the addition of which leads to acrylamide polymers which, at the same time, have a very high molecular weight and nevertheless are completely soluble in water.

The technical teaching which can be taken from the abovementioned US-PS does not encourage those skilled in the art to develop the solution polymerisation method further because only the addition of ammonia guarantees the absolutely necessary solubility in water of the high-molecular products, since it is explicitly explained that products which are only swellable in water or which are even insoluble in water are obtained when ammonia is absent. Thus there is no possibility of being able to obtain products which have an optimum retention and drainage capacity without the restriction regarding the use of ammonia, which is troublesome for the abovementioned reasons.

These difficulties which can be seen from the state of the art cited hitherto and which have arisen with solution polymerisation for several decades apparently led to the increasing use of precipitation polymerisation again, in place of solution polymerisation. An example of this is DT-AS (German Published Specification No.) 1,301,079. The reaction is carried out in a mixture of water and alcohols with the object of thus achieving control of the molecular weight. However, this control leads to a limitation of the molecular weight, by which means it is in no way possible to achieve the very high molecular weights which are required for optimum retention and drainage capacity. This DT-AS (German Published Specification) can therefore be left out of consideration.

The same applies to the guidelines (for technical procedure) which can be taken from U.S. Pat. No. 3,509,113, the only interesting feature of which, in this context, is that on the date of publication of this US-PS (28.4.1970) those skilled in the art still had to draw the technical teaching, from column 3 of this specification, that although solution polymerisation in itself would be preferable because of the desired formation of linear-chain high-molecular polymers, there are, however, at the same time so many disadvantages associated with this method that attention is turned to the route of precipitation polymerisation, which is recommended in this specification as a solution to the problem, in order to obtain products of this type. In 1970 it was still believed that it was possible to avoid the feared rise in viscosity, the risk of crosslinking associated therewith and the resulting insolubility and uselessness of the finished product only in this way.

A further process for the preparation of water-soluble, high-molecular acrylamide polymers by solution polymerisation was disclosed in DT-AS (German Published Specification No.) 1,915,903, which was published for the first time as a DT-OS (German Published Specification) on the 30th July 1970. Apart from the fact that, according to Vollmert, B.:Grundriss der makromolekularen Chemie (Basics of Macromolecular Chemistry), Berlin, 1962, page 38, the catalyst which, according to sub-Claim 5 of this specification, is particularly preferred in this context, that is to say azo-bis-iso-butyronitrile, displays its most advantageous catalyst action in a temperature range of 20° to 100° C, but, on the other hand, it can be seen from column 2, line 41 of the abovementioned DT-AS (German Published Specification), that it is alleged that no polymerisation takes place below a minimum temperature of 37.8° C, which leads those skilled in the art to the conclusion that although the polymerisation will already be initiated, with the abovementioned catalyst, at 20° C it will, however, nevertheless be able to increase in rate only at a minimum temperature of 37.8° C, which gives those skilled in the art no clear guidelines for technical procedure, it is possible, with the process described here and according to the examples mentioned in the specification, only to obtain acrylamide polymers which have relatively low viscosities (maximum 47 cP) and thus relatively only low molecular weights and which are not suitable for the optimum retention of flushable solids and for particularly good acceleration of the drainage of suspensions.

However, eight months after the abovementioned DT-AS (German Published Specification No.) 1,915,903, those skilled in the art were informed, by U.S. Pat. No. 3,573,263, published on 30.3.1971, of a process which, with the aid of this preferred catalyst, that is to say azo-bis-iso-butyronitrile (also described as azo-iso-butyric acid nitrile in the literature), nevertheless enables acrylamide polymers which are soluble in water and, at the same time, have very high molecular weights to be obtained when this catalyst is used as an initiator/catalyst if it is combined with a persulphate or a hydrogen peroxide redox system. According to column 1, lines 30 to 32, water-soluble, extremely high-molecular acrylamide polymers with a molecular weight of one million to 100 million are obtained in this way. Although those skilled in the art observe an inconsistency, which may give rise to doubts, in the present publication in that molecular weights of at most 10 million, can be achieved for the acrylamide polymer products when the reaction is carried out using appropriately preferred embodiments of the inventive concept, as is generally the case in the examples, whilst, on the other hand, it is maintained, without confirmation from examples, that it is possible to obtain products with a molecular weight of up to 100 million, the increase in the molecular weight signifies an advance which is so considerable, with regard to the state of the art accepted hitherto, that those skilled in the art are restrained from using any initiator/catalyst other than that mentioned, since the success in this US-PS is linked exclusively to the use of azo-iso-butyric acid nitrile as the catalyst, in combination with the redox system mentioned. This view is strengthened by DT-OS (German Published Specification No.) 1,948,994, which was published only 4 weeks later on 15.4.1971, because this specification also mentions, on page 4 of the description, azo-di-iso-butyric acid nitriles or redox systems as catalysts, although it does not mention both systems in combination with one another, which is why the molecular weights mentioned here do not exceed a limit of four million. As is known, macromolecular substances of this type are not particularly suitable for the retention of flushable solids and for accelerating the drainage of suspensions.

When the process which can be taken from U.S. Pat. No. 2,050,988, which was published for the first time as a DT-OS (German Published Specification No.) on 13.5.1971 and was laid open on 22.5.1974, is carried out it is also possible, according to column 6, lines 10 and 35 and according to the examples given there as preferred embodiments of the inventive concept, to achieve only molecular weights of 3 to 5 million, although, because of the requisite photopolymerisation by irradiation with light, it is necessary, in order to produce a rapid action of the light to carry out the preparation of the water-soluble acrylic polymers, mentioned in the application, in large shallow containers, that is to say in a fairly inexpensive form, instead of in the customary closed vessels, an additional disadvantage being that, because the surface-area of the solution to be polymerised is very large; as described above, it is not possible to prevent a very large area of contact, due to this large surface area, with the atmospheric oxygen. On the other hand, the surface area of the liquid is considerably smaller in commercially available closed vessels and, moreover, the necessary removal of oxygen can be effected rapidly in such vessels by simple known flushing with an inert gas. Therefore, those skilled in the art would be unable to obtain any guidelines from this publication with regard to the technical procedure for the preparation of acrylamide polymers which have an extremely high molecular weight and, at the same time, are readily soluble in water. Patent Application DT-OS (German Published Specification No.) 1,794,055, which was laid open on 7.10.1971, should also be mentioned in this connection; this application relates to substances, the addition of which, according to the statement on page 14 of the application, stabilises polyacrylamide against becoming insoluble and, at the same time, makes possible very substantial polymerisation of the remaining acrylamide. Moreover, a third advantage is said to be that the flocculating action of the polyacrylamide is not reduced. However, this problem of providing a polyacrylamide which is soluble in water and which nevertheless has a very high molecular weight, which has been described above and which it has not yet been possible to solve in an optimum manner, cannot be solved according to this DT-OS (German Published Specification) if ethylene glycol is selected as the substance to be added (middle of page 14), and therefore those skilled in the art in future avoid this substance as a polymerisation regulator.

Compared with the state of the art disclosed up to this point in time, the technical teaching which can be taken from DT-OS (German Published Specification No.) 1,645,065 and DT-OS (German Published Specification No.) 1,645,066, shows considerable improvements because, with the aid of a polymerisation process which can be carried out relatively rapidly, products are obtained which, although they do not have optimum molecular weights, nevertheless have advantageous molecular weights of 8.4 to 21.4 million. The processes published in these two DT-OS (German Published Specification) texts are carried out, in the presence of aqueous solutions having an alkaline reaction, under the action of gamma rays and the starting concentration of the acrylamide to be polymerised is relatively high. Apart from the fact that products with a molecular weight of at most 22 million do not exhibit optimum retention of flushable solids and do not exhibit maximum acceleration of the drainage of suspensions, a process of preparation of this type has not yet been put to any relatively large scale practical use since its publication (20.4.1972), because of the very high costs of the apparatus which is necessary here and, moreover, because carrying out the process is not without hazards.

With the method for the preparation of water-soluble, high-molecular acrylamide polymers which was first disclosed on 1.2.1973 in DT-OS (German Published Specification No.) 2,136,384, those skilled in the art are recommended to use only a very specific polymerisation regulator, in the form of the accelerator beta-morpholinopropionamide, in order to obtain products of this type. Thus, those skilled in the art must assume that other polymerisation regulators are inappropriate for obtaining the high-molecular compounds which are desired, as mentioned above. Nevertheless, it can be seen from the upper half of page 2 of this DT-OS (German Published Specification) that, even in the case of the products according to the invention, the "greatly increasing tendency of the molecules to aggregation and to gel formation" is given as a reason for the viscosity figures not having been converted into molecular weights, and, for lack of other information regarding the solubility in water of the high-molecular acrylamide polymers which can be obtained according to this process, those skilled in the art must conclude from this that the products produced in this way are not completely soluble in water, although at another point in this DT-OS (German Published Specification) a figure of only 38 cP is given as the solution viscosity, which, as explained further below, corresponds to a very low molecular weight. On the whole, for the abovementioned reasons, those skilled in the art will not want to use beta-morpholinopropionamide as the polymerisation regulator if they want to produce particularly high-molecular, water-soluble acrylamide polymers which have particularly good retention properties and drainage acceleration properties.

NL-A 7,716,232 was first published on 12.3.1973, about five weeks after the abovementioned DT-OS (German Published Specification). The recommendation in this Netherlands application, similar to that in the abovementioned DT-OS (German Published Specification), is to use only a very specific, particularly good polymerisation regulator. In this case, alkali metal dithionite or ammonium dithionite is recommended. In this context, the average person skilled in the art gains the impression, from page 2, line 7, that it is advised that substances of this type, which are advantageous in the opinion of the authors of the abovementioned text, are obtained only by the qualitative limitation to very specific polymerisation regulators in combination with a specific starter and a specific pH. Moreover, in contrast to other recommendations which can be taken from the state of the art, a pH range of 1 to 7 (page 3) is recommended and particular importance is attached to the presence of oxygen (page 3, paragraph 3). Despite these supposed advantages, the viscosity obtained when only 0.4% by weight of a persulphate initiator is used is, according to page 5 of this publication, so high (3,300) after a polymerisation time of one to two hours that the product is almost at the gelling point. Unfortunately, no information regarding the storage life of unstable products of this type is given to those skilled in the art, because, according to the examples given in the specification, these substances are used immediately. Since, even at this point in time, the possible disadvantages of a polymerisation in the presence of oxygen and at an acid pH were already known, from other publications, to those skilled in the art they will be deterred, in view of the fact that the highest molecular weights which can be calculated indirectly from the specification are 8 million, from proceeding further with the route recommended here for the preparation of high-molecular, water-soluble acrylamide polymers and from proceeding further with this route.

Apparently because of the numerous limitations resulting from the abovementioned state of the art when the solution polymerisation process is employed, and because of the restricted further developments to be expected as a result of these limitations, increasing attention has been paid again more recently to the precipitation polymerisation process. A further development of this type can be seen, for example, in Patent Application No. P 22 43 155, published on 28.3.1974. Apart from the fact that the technical teaching which can be taken from this application restricts those skilled in the art to the use of a single polymerisation regulator in the form of polyvinyl alcohol (and, moreover, particularly high molecular weights are not obtained), those skilled in the art of solution polymerisation must find that transfer of the preparation of the substance indicated here, which is alleged to be particularly advantageous, to the solution polymerisation process leads to a molecular weight of only 3.4 million, even when otherwise relatively favourable conditions are maintained, and this is confirmed further below in the form of a comparative example. Moreover, the products prepared according to the abovementioned DT-OS (German Published Specification) with the aid of precipitation polymerisation (as far as such products are indicated) also do not reach a particularly high molecular weight; although, according to column 4, line 61, the molecular weight is said to be more than 3 million, the viscosity of the product as a 1% strength aqueous solution is, however, according to column 6, lines 28 and 29, 1,760 cP, which corresponds to a molecular weight of far below 10 million. Thus, for the average person skilled in the art, the use of polyvinyl alcohol as a polymerisation accelerator is not appropriate, either within the framework of the precipitation polymerisation process or within that of the solution polymerisation process, if it is desired simultaneously to obtain extremely high molecular weights and particularly good solubility in water for acrylamide polymers which have a very high capacity for retention of flushable solids and for acceleration of the drainage of suspensions.

On the other hand, a considerable improvement in this field can be seen from the patent application first published as Offenlegungsschrift (Published Specification) No. 24 21 020 on 21.11.1974. This application relates to the preparation of polymers with a high molecular weight from acrylamide and it is alleged that these polymers can be employed as thickeners, flocculating agents and agents for regulating the mobility or viscosity and also for drainage and for the retention of pigments and for various other purposes. According to page 17 of this DT-OS (German Published Specification) the polymers have, inter alia, the advantage that they are stable in the absence of acrylamide polymer degradation initiators.

On the other hand, however, those skilled in the art obtain from this DT-OS (German Published Specification) the restrictive information that products of this type are obtainable from the monomers only with the aid of ionising radiation of high energy. Since this process is not only not without hazards but is also very expensive and, moreover, instead of the cheap homopolymers, the more expensive copolymers with numerous variants in the monomer mixture are usually preferred, this publication ultimately gives a motive for testing whether products of this type cannot be produced more economically, and thus ultimately with a greater technical advance, in some other way. Moreover, according to page 14 of this DT-OS (German Published Specification) conversion of the monomer solutions into gels is preferred; however, it is precisely such a conversion which is to be avoided for preparation of auxiliaries of the initially mentioned type. Because, apparently, the object was different, those skilled in the art are unable to find in this specification a solution which enables them to adopt an appropriate technical procedure and, as is confirmed on page 15 of this DT-OS (German Published Specification), the products actually contain about 10% of insoluble matter, which proportion cannot be used for the initially mentioned purposes.

A further solution polymerisation process for the preparation of polyacrylamide, although this is for partially saponified polyacrylamide, has been disclosed in DT-OS (German Published Specification) No. 24 22 794, which was published for the first time on 21.11.1974. This publication indicates to those skilled in the art that the best results with regard to flocculating capacity, solubility in water and high molecular weight can be achieved only if, according to the characterising part of Patent Claim 1 of this specification, boric acid is additionally present when the polymerisation is carried out. Apart from the fact that this prevents those skilled in the art from using polymerisation regulators other than boric acid, it is possible with the aid of this process, according to the description given on page 5 of the specification, only to obtain polyacrylamides with a molecular weight of at most 12 million. Since, from the other state of the art, higher molecular weights coupled with solubility in water were already known, in some cases, to be achievable without the use of boric acid, this publication also provides no information on the preparation of acrylamide polymers which have extremely high molecular weights and, at the same time, are soluble in water.

DT-OS (German Published Specification) No. 24 46 257, which was published on 3.4.1975, is one of the latest publications, relevant to the state of the art in this context. This specification gives a process, which in itself represents a considerable advance, for the preparation of water-soluble, high-molecular polyacrylamide but, in contrast to the abovementioned state of the art in which hydrolysis is preferred, this specification again presents the view of those skilled in the art that hydrolysis is undesirable and a disadvantage if it is the intention to obtain extremely high-molecular, water-soluble acrylamide polymers with particularly good flocculation properties (compare page 1, second sentence of this DT-OS (German Published Specification). Therefore, the subject of this publication is largely directed towards the suppression of hydrolysis and for this reason amine compounds are added in order to regulate the polymerisation. Since this has already been indicated in principle in U.S. Pat. No. 3,002,960, which was already . . . on 3.10.1961 and has already been considered further above, the disadvantages mentioned at that point also apply here. Accordingly, it is also worthy of note that it can be seen from DT-OS (German Published Specification No.) 2,050,988 that the amines recommended in DT-OS (German Published Specification No.) 24 46 257 are used as agents for limiting the chain length in the abovementioned earlier DT-OS (German Published Specification). From this, those skilled in the art obtain the information that although the undesirable hydrolysis is suppressed by these amines, maximum development of the chain length is, however, on the other hand also hindered if not entirely prevented and, as a result, it is also not possible to achieve extremely high molecular weights with the aid of this process.

OBJECT OF THE INVENTION

It is therefore an object of the invention to provide a suitable auxiliary agent which have an extremely high molecular weight and are particularly readily soluble in water and with which it is intended to achieve an optimum retention capacity with regard to flushable solids and outstanding acceleration of the drainage of suspensions. This auxiliary agent can be used for the more rapid treatment of solid and liquid substances which can be utilised industrially, such as industrial water, effluents and sludges, inter alia, in the paper industry, and for improving the structure of soils. Another object of the invention is to provide a suitable process for the preparation of the auxiliary agent in which it is necessary not only to assist the growth of the individual polymer chains, that is to say to prevent stopping reactions as far as possible, but also, within the framework of this polymerisation, as far as possible to restrict or entirely to prevent the reactions which lead to crosslinking, and this then provides the conditions for the prevention of the irreversible increases in viscosity which are caused by crosslinking and which lead to gel formation and to the product becoming insoluble.

THE INVENTION

Accordingly this invention relates to an auxiliary agent for improving the retention of flushible solids and for accelerating the drainage of suspension which comprises a high molecular, water soluble acrylamide polymer obtained by solution polymerisation of an acrylamide monomer, the solution polymerisation of this monomer is carried out using 3 to 20% by weight of acrylamide at a pH value of 8 to 13 and with the addition, in at least three steps at intervals, of radical initiators the initiators being added in a total amount — based on the amount of acrylamide monomer — of 0.02 to 1.0% by weight, and with the addition of polymerisation regulators in an amount of at most 20 g per mol of acrylamide, that acrylamide polymer being in the form of storage stable homopolymer which has a molecular weight of 30 to 300 million.

The auxiliary agents according to the invention have a very good storage stability and outstanding solubility in water and additionally, however, with regard to their diverse use, exhibit outstanding retention of flushable solids, which is confirmed further below in the examples, and, moreover, at the same time exhibit an equally advantageous acceleration of drainage and finally also an above average flocculating capacity. The auxiliary agents according to the invention have a special molecular weight of 30 to 200 millions; top-grade products show a molecular weight of 30.6 to 98.5 millions.

Differences with regard to the structure and the capacity of auxiliary agents according to the invention, of this type are, of course, also to be seen within the above-mentioned limits and for this reason the attention of those skilled in the art is drawn, in the following text, to specially selected top-grade products.

Preferred auxiliary agents according to the invention are produced if the solution polymerisation proceeds at a pH value of 10 to 12.5 and if furthermore, the free radical initiators are added, in a total amount -based on the amount of acrylamide monomers- of 0.06 to 0.1% by weight, in at least three steps at intervals during the preparation process in such a way that the concentration of initiator in the solution does not exceed 0.039% during the entire preparation process.

The amount of the polymerisation regulator is, however, not so critical; the regulator can be added in an amount of only one g per mol but it is equally possible for it to be added in large amounts of up to about 20 g per mol of acrylamide without the structure of the auxiliary agent thus obtained becoming substantially different.

Although the structure of the auxiliary agent according to the invention is not linked to a very specific process, it is, however, appropriate, within the framework of reproducible, accurate instructions, which are as detailed as possible, for technical procedure, which are to be imparted to those skilled in the art as the subject of the abovementioned invention, to keep to a specific sequence of process steps if it is desired to obtain particular efficient auxiliary agents within the scope of the abovementioned fields of application.

Thus it is advisable to prepare the auxiliary agent by carrying out the polymerisation reaction at a temperature of, in general, at most 80° C, it being best to carry out the reaction at a temperature of 25° to 60° C.

The best products are obtained by keeping to the series of process steps, arranged in a time sequence, as set out below:

1. Preparation of a 5 to 20% strength by weight (optimum concentrations 8 to 15% strength by weight) acrylamide solution, based on the total solution, in deionised, boiled and cooled water, 2. Addition of 1 to 28% by weight (optimum amount 2.8 to 24% by weight), based on solid acrylamide, of a polymerisation regulator to the solution, 3. Adjustment of the pH value to a range of 8 to 13 (optimum range 10 to 12.5) by means of substances having a basic reaction, 4. Flushing of the reaction vessel with an inert gas and adjustment of the temperature of the reaction mixture to 10° to 40° C (optimum temperature 20° to 35° C), 5. First addition of 0.008 to 0.03% by weight (optimum amount 0.01 to 0.02% by weight), based on solid acrylamide, of one to four (optimum number one to three) free radical initiators, 6. First processing of the reaction mixture at a temperature of 10° to 40° C (optimum temperature 20° to 35° C) for four to 12 hours (optimum time five to eight hours), whilst stirring, 7. Raising of the reaction temperature to 25° to 60° C (optimum temperature 30° to 55° C), 8. Second addition of 0.01 to 0.035% by weight (optimum amount 0.01 to 0.03% by weight), based on solid acrylamide, of one to four (optimum number one to three) free radical initiators and optionally of a diluent in an amount of, in general, 12 to 37% by weight, which is the optimum amount, based on the total amount of the solution, 9. Second processing of the reaction mixture at temperatures of 25° to 60° C (optimum temperatures 30° to 55° C) for 10 to 18 hours (optimum time 12 to 15 hours), whilst stirring, 10. Third addition of 0.01 to 0.035% by weight (optimum amount 0.01 to 0.03% by weight), based on solid acrylamide, of a free radical initiator and optionally of a diluent in an amount of 0.01 to 15% by weight (optimum amount 0.1 to 15% by weight), based on the total amount of the solution, 11. Third processing of the reaction mixture at a temperature of 25° to 60° C (optimum temperature 30° to 55° C) for 4 to 8 hours (optimum time 5 to 7 hours), whilst stirring, 12. If the residual monomer content is more than 2%, 0.02 to 0.05% by weight (optimum amount 0.02 to 0.03% by weight), based on solid acrylamide, of a free radical initiator is added, 13. When a residual monomer content is eliminated according to process step No. 12, further processing of the reaction mixture at a temperature of 25° to 60° C (optimum temperature 30° to 55° C) for 4 to 8 hours (optimum time 5 to 7 hours), whilst stirring, and 14. Optional drying and comminution of the auxiliary agent thus prepared.

Under the abovementioned conditions an auxiliary agent is obtained which is so efficient that the product thus produced has, as a result, properties which have not been attained hitherto and which are described in more detail further below. It can be deduced from this that if it appears reasonable to those skilled in the art to prepare the auxiliary agent in a manner other than that described above, for example by making qualitative or quantitative changes, for example also with regard to the sequence of process steps, auxiliary agents according to the invention will still be obtained, even though these may not have quite the optimum capacity which results when the abovementioned process conditions are adhered to exactly.

As already shown above, the amount of the polymerisation regulators is, not so critical, whereas the choice of the polymerisation regulator is particularly important. Best results will be achieved, when the polymerisation is regulated by at least one agent selected from the group comprising alkylene glycols, aliphatic dicarboxylic acids, lower aliphatic chlorinated hydrocarbons, acetic acid, metal acetates, citric acid, glycerol, mannitol, taurine and tetrahydrofurane. Amongst the types of compound of this group which have already been mentioned, those which can be employed particularly suitably are ethylene glycol and propylene glycol amongst the alkylene glycols, oxalic acid and succinic acid amongst the aliphatic dicarboxylic acids, chloroform and carbon tetrachloride amongst the lower aliphatic chlorinated hydrocarbons, and zinc acetate amongst the metal acetates.

This was in no way to be expected since other substances, some of which are already known from the abovementioned state of the art, which had been recommended in the literature as being particularly good polymerisation regulators, could not be used for the abovementioned auxiliary agent according to the invention because they were ineffective. Thus, it was surprising that compounds such as acetone, methanol, ethanol, isopropyl alcohol, polyethylene glycol, polvinyl alcohol, erythritol, malic acid, ascorbic acid, toluene, xylene, urea, acetic acid ethyl ether and ethylene glycol diacetate led to products which displayed capacities which were in no way optimum and which either did not have an optimum solubility in water or did not have a particularly high molecular weight.

The auxiliary agent according to the invention is far superior to the products known hitherto in this respect also because it displays almost equally good optimum capacities in diverse fields of use. This homopolymer, which is completely soluble in water is very suitable for improving the retention of flushable solids, for accelerating the drainage of suspensions, for rapid treatment of solid and liquid substances which can be utilised industrially, such as industrial water, effluents and sludges, above all in the paper industry, and for improving the structure of soils. The suitability of the auxiliary agent is specifically related to its use in industries which process cellulosic substances, especially the papermaking industry. The same auxiliary agent, according to the invention, can be employed here as a highly effective flocculating agent on the one hand and, on the other hand, can equally well be employed as a retention agent for paper fillers. Its use as a flocculating agent relates both to the treatment of raw water and to the purification of effluents.

A further important field of application for the auxiliary agent is its use as a protective colloid when flushing boreholes. It can be used for this purpose, for example, equally as well as the water-soluble hydrolysis product of polyarylonitrile which is known from DT-BP 20 31 972, that is to say it is also very suitable for water-based flushing of deep boreholes and is also compatible with very diverse carrier substances, such as, for example, attapulgite and/or asbestos and/or bentonite.

In addition, the possibilities for use of the auxiliary agent according to the invention, which cover many fields, also extend to its use as a viscosity regulator in the secondary and/or tertiary extraction of mineral oil. A particularly advantageous factor here is that the auxiliary agents are not precipitated, as the corresponding polyacrylate salts, in the presence of calcium ions, even when the pressure and temperature conditions are unfavourable, but remain in solution and thus retain in full their ability to function and their efficiency, even when the conditions with regard to the geological formations are unfavourable.

Moreover, the auxiliary agents according to the invention can also be employed for improving the flow of liquid and aqueous media by means of thickening. For example, the resistance of water flowing in pipelines or at solid parts around which there is flow can be reduced by up to 80% by the use of the acrylamide polymers according to the invention which have an extremely high molecular weight and are nevertheless soluble in water, because a predominantly turbulent flow is converted by the use of the products according to the invention into an almost laminar flow.

The same auxiliary agent according to the invention can, in addition, also be employed in the field of the stabilisation of dispersions because it leads to thickening of the carrier medium and thus successfully prevents segregation of the dispersions.

In addition, the auxiliary agent according to the invention can be used equally successfully in all branches of industry in which treatment of inorganic and/or organic sludges is necessary. This is particularly relevant to the treatment of mud suspensions, for example for the preparation of ores.

Finally, mention should also be made of the efficiency of the auxiliary agent according to the invention as a flocculating agent for flowable, physico-chemically inhomogeneous substances which are to be treated, such as are obtained, for example, from the production, treatment and purification of sugar.

Moreover, the wide-ranging fields in which the auxiliary agent according to the invention can be employed, and which can be seen from the above possibilities for application are not restricted to the abovementioned special fields.

Following this more general information regarding the product according to the invention, the best possibility for its preparation and its diverse use, the subject of the invention will now also be explained with the aid of prepration processes given by way of example. However, the subject of the invention which is disclosed as precisely as possible by the examples which now follow is not restricted to the scope of these examples.

The values given in the examples were always determined according to the same appropriate methods of determination: 1. Determination of the residual monomer content. Although the residual monomer contents are not mentioned in the examples which follow because they are always less than 0.4% by weight, based on converted acrylamide, in the finished products according to the invention and are thus negligible, a check on the residual monomer content was, however, carried out by two different processes for all the examples in order to confirm this with certainty; the methods used were either stoichiometric addition of bromine to the double bond of the monomers, more detailed instructions on which can be taken from "Chemistry of Acrylamide", 1969, a company publication of the American Cyanamid Corporation, or quantitative determination of the residual acrylamide monomers by column chromatography, as is described in more detail in the journal "Chromatographie", No. 4, 1971, page 391. 2. Determination of the molecular weight by calculation from the limiting viscosity number $[\eta]$ determined by measurement methods. The determination of the limiting viscosity number $[\eta]$, which is required in order to determine the molecular weight, is carried out with the aid of viscosity measurements on polyacrylamide solutions in redistilled water in a commercially available Ubbelohde viscometer at 25° C. Although the use of the Ubbelohde viscometer is generally known to those skilled in the art, the essential points of the measurement method will be outlined briefly in the following text so that the method used to calculate the molecular weight by means of the limiting viscosity number is clear. Starting from a polyacrylamide solution of 0.1 g per 100 ml of solvent, the solution is first filtered through a G 3 suction filter and the concentration of the filtrate is then determined. The correspondingly lower concentration which is required for measurement in the viscometer is achieved by appropriate dilution of the solution. The specific viscosities at the various concentrations are then calculated from the relative viscosities obtained in the customary manner by means of the Ubbelohde viscometer ($\eta_{sp} = \eta_{rel} - 1$) and the result is then plotted graphically as a function of $\eta_{sp/c}$ against $c$. The linear dependence thus determined by means of this graph is then extrapolated to zero concentration and the desired limiting viscosity number (intrinsic viscosity) is thus obtained.

As is mentioned, inter alia, in the periodical "Journal of Applied Polymer Science", volume 17, page 1,749 (1973), an empirical relationship exists between the limiting viscosity number and the molecular weight. This relationship can be expressed by the following formula:

$$[\eta] = 6.8 \times 10^{-4} \times \overline{M}_n^{0.66}$$

The molecular weight can then accurately be calculated with the aid of the reference formula given above if the limiting viscosity numbers have been obtained from appropriate measurements in distilled water at 25° C.

The measurement methods used to test the technological properties of the acrylamide polymer according to the invention now follow.

3. Determination of the flocculation and sedimentation. Since, as is known, the flocculation and drainage capacity of polyacrylamides is dependent on the molecular weight and increases proportionally to the molecular weight, some of the products obtained in accordance with the examples, according to the invention, which follow were subjected to a so-called kaolin flocculation test. The products employed were the auxiliary agents obtained according to Examples 2, 5 and 8 according to the invention. These products, according to the invention, were compared with commercially available products, which are marketed, for example, under the names "Praestol" and "Sedipur", by subjecting them to the same abovementioned kaolin flocculation test. This flocculation test bears a very close relationship to conditions in practice since in this case a suspension, which has properties very similar to those of a paper or fibre suspension, of a kaolin substance, which is known to those skilled in the art as an important filler in paper making, is used. The test method is carried out in the same manner, as follows, in all of the use examples which follow:

Commercially available kaolin is added to tap water which has a pH of 7.8 and the mixture is stirred for about three minutes using a known stirrer (Ultra-Turrax). A kaolin suspension which has a kaolin concentration of 30 g per 1 of water is formed. This turbid kaolin suspension is filled into a measuring cylinder of 500 cm³ capacity. A so-called stock solution in which an amount of 0.01% by weight of the particular polyacrylamide, dissolved in water, is distributed is prepared separately and an amount, which can be seen from the table, of this polyacrylamide solution is then metered into the kaolin suspension in the abovementioned measuring cylinder. The measuring cylinder is then closed and shaken exactly nine times by tilting up and down. Empirically, this always produces the same mixing of the solution of flocculating agent with the kaolin suspension. The measuring cylinder is now placed upright on a work surface and the settling of the solids meniscus, as a function of time, and the height of the clear zone thus formed above the kaolin turbidity, in mm after intervals of 15, 30, 60, 120 and 180 seconds, are measured and entered in a table. In addition, the clarity of the water above the flocculated kaolin is assessed empirically according to the three gradings "turbid", "slightly turbid" and "clear", which can be seen from the corresponding table which follows.

4. Determination of the acceleration of drainage. The drainage capacity of corresponding products is determined from the characteristic freeness increase in ° SR. The freeness increase is carried out and determined in accordance with the method in Instruction Sheet 107 of the Verein der Zellstoffund Papierchemiker und Ingenieure (Association of Pulp and Paper Chemists and Engineers). In these examples, both the products according to the invention and the comparison products are added, as retention agents, in the form of their aqueous solutions, to a newsprint pulp suspension and the concentration of this aqueous solution was so selected that the content of the particular retention agent is 0.05, 0.1, 0.2 and 0.3% by weight, calculated for a solids suspension which contains 10% by weight of kaolin, the pH of the suspension being 4.8 and being adjusted to this value with a 1% strength by weight aqueous alum solution. The abovementioned newsprint pulp suspension is obtained by mechanical defibering of usual commercial newsprint, followed by speck-free pulping of the defibrated product in a conventional kitchen mixer. The individual examples now follow and, because the examples were always carried out in the same way, only Example 1 is given in the form of a text and the other examples, for which the method of Example 1 was repeated, follow in the form of a table. Examples 1 to 16 (Table 1) are examples according to the invention and Examples 17 to 39 (Tables 2 and 3) are, on the other hand, comparison examples. These tables are followed by the use examples, summarised in Table 4, for the flocculation and drainage capacity of corresponding products and by the examples, summarised in Table 5, of the acceleration of drainage by means of corresponding products as a result of freeness increase.

The results which can be seen from the examples which follow and the related tables are compared, in a discussion and evaluation, which follows the examples and tables, which are given together for the sake of clarity.

EXAMPLE 1

500 ml of a 10% strength by weight acrylamide solution are prepared, using water as the solvent, this water first being treated in a commercially available ion exchanger, boiled for ten minutes and flushed with nitrogen for half an hour and then cooled, in a glass vessel which is provided with a stirrer, a thermometer and a reflux condenser. The abovementioned acrylamide solution is then mixed, in the apparatus mentioned initially, with 1 g of ethylene glycol and the pH value is adjusted to 11.0 by means of 1 N sodium hydroxide solution. The reaction vessel containing this charge is then flushed using nitrogen as the inert gas and brought to the requisite reaction temperature of 35° C. The catalyst, in the form of $(NH_4)_2S_2O_8$, is then added in an amount of 0.01% by weight, based on the basic substance, after which the reaction mixture thus obtained is processed for six hours at a temperature of 35° C, whilst stirring continuously and under an atmosphere of nitrogen gas. The temperature of the reaction mixture is then raised to 50° C and a further amount of 0.02% by weight of the abovementioned catalyst, together with about 100 ml of solvent, in the form of water, are then added and the polymerisation reaction is continued for a further fourteen hours under a nitrogen atmosphere, after which a further 200 ml of water are added at the same time as catalyst is added in an amount of 0.03% by weight, this latter addition being the third stage of the catalyst addition. After a reaction period of a further eight hours at a temperature of 50° C, the polymerisation is then concluded after a total of twenty-eight hours. A solution, which is viscous but able to flow fairly readily, of the polyacrylamide in a concentration of 7% by weight is obtained. The polymeric substance is then precipitated in methanol and dried gently for 20 hours at 45° C. The molecular weight determined by calculation from the [$\eta$]-intrinsic viscosity value was 44.2 million.

Table 1

| Example No. | Acrylamide* in g | Water ml | Polymerisation regulator in g | pH | Initiator % by weight added | Temperature ° C | After 6 hours Initiator % by weight added | Temperature ° C | After 20 hours Initiator % by weight added | Dilution ml | After 24 hours Initiator % by weight added | Reaction time (hrs.) | Molecular weight |
|---|---|---|---|---|---|---|---|---|---|---|---|---|---|
| 1 | 50 | 450 | Ethylene glycol 1.0 | 11.0 | $(NH_4)_2S_2O_8$ 0.01 | 35 | $(NH_4)_2S_2O_8$ 0.02 | 50 | $(NH_4)_2S_2O_8$ 0.03 | 100 | — | 28 | $44.2 \times 10^6$ |
| 2 | 50 | 450 | Ethylene glycol 2.0 | 11.9 | $K_2S_2O_8$ 0.01 | 35 | $K_2S_2O_8$ 0.025 | 50 | $K_2S_2O_8$ 0.03 | 300 | — | 28 | $80.7 \times 10^6$ |
| 3 | 50 | 450 | Ethylene glycol 4.0 | 12.0 | $K_2S_2O_8$ 0.01 | 35 | $K_2S_2O_8$ 0.01 | 50 | $K_2S_2O_8$ 0.03 | | $K_2S_2O_8$ 0.02 | 30 | $86.2 \times 10^6$ |
| 4 | 50 | 450 | Ethylene glycol 10.0 | 12.3 | $K_2S_2O_8$ 0.01 | 35 | $K_2S_2O_8$ 0.02 | 50 | $K_2S_2O_8$ 0.03 | 100 | — | 28 | $95.9 \times 10^6$ |
| 5 | 50 | 450 | Ethylene glycol 12.0 | 11.9 | Isoascorbic acid/$H_2O_2$ 0.01 | 20 | Isoascorbic acid/$H_2O_2$ 0.01 | 30 | Isoascorbic acid/$H_2O_2$ 0.02 | 100 | $K_2S_2O_8$ 0.02 | 30 | $94.7 \times 10^6$ |
| 6 | 50 | 450 | Ethylene glycol 20.0 | 12.1 | $K_2S_2O_8$ 0.01 | 35 | $K_2S_2O_8$ 0.02 | 50 | $K_2S_2O_8$ 0.03 | | — | 28 | $2.2 \times 10^6$ |
| 7 | 50 | 450 | Carbon tetrachloride 8.0 | 11.5 | $K_2S_2O_8$ 0.01 | 35 | $K_2S_2O_8$ 0.01 | 50 | $K_2S_2O_8$ 0.01 | | $K_2S_2O_8$ 0.03 | 28 | $33.1 \times 10^6$ |
| 8 | 50 | 450 | Chloro- | 12.0 | $(NH_4)_2$ | 35 | $(NH_4)_2$ | 50 | $(NH_4)_2$ | 100 | — | 28 | $58.6 \times 10^6$ |

Table 1-continued

| Example No. | Acryl- amide* in g | Water ml | Polymeri- sation regulator in g | pH | Initiator % by weight added | Temp- erature °C | After 6 hours Initiator % by weight added | Temp- erature °C | After 20 hours Initiator % by weight added | Dilu- tion ml | After 24 hours Initiator % by weight added | Re- action time (hrs.) | Mole- cular weight |
|---|---|---|---|---|---|---|---|---|---|---|---|---|---|
| 9 | 50 | 450 | Glycerol 6.0 | 12.0 | $S_2O_8$ 0.01 $K_2S_2O_8$ 4.0 | 35 | $S_2O_8$ 0.02 $K_2S_2O_8$ 0.02 | 50 | $S_2O_8$ 0.03 $K_2S_2O_8$ 0.03 | 100 | — | 28 | $48.0 \times 10^6$ |
| 10 | 50 | 450 | Acetic acid 6.0 | 11.5 | AIBN 0.01 | 45 | AIBN 0.03 | 55 | AIBN 0.03 | 100 | — | 24 | $35.2 \times 10^6$ |
| 11 | 50 | 450 | Taurine 8.0 | 12.0 | $K_2S_2O_8$ 0.01 | 35 | $K_2S_2O_8$ 0.02 | 50 | $K_2S_2O_8$ 0.03 | 100 | — | 28 | $98.5 \times 10^6$ |
| 12 | 50 | 450 | Oxalic acid 8.0 | 11.4 | $K_2S_2O_8$ 0.01 | 35 | $K_2S_2O_8$ 0.02 | 50 | $K_2S_2O_8$ 0.03 | — | — | 28 | $45.0 \times 10^6$ |
| 13 | 50 | 450 | Citric acid 4.0 | 11.3 | Isoascor- bic acid/ $H_2O_2$ 0.01 | 20 | Isoascor- bic acid/ $H_2O_2$ 0.02 | 30 | Isoascor- bic acid/ $H_2O_2$ 0.03 | | $K_2S_2O_8$ 0.02 | 26 | $39.3 \times 10^6$ |
| 14 | 50 | 450 | Tetra- hydro- furane 4.0 | 12.8 | $K_2S_2O_8$ 0.01 | 35 | $K_2S_2O_8$ 0.02 | 50 | $K_2S_2O_8$ 0.03 | — | — | 28 | $36.4 \times 10^6$ |
| 15 | 50 | 450 | Zinc acetate 8.0 | 11.4 | $(NH_4)_2 S_2O_8$ 0.01 | 35 | $(NH_4)_2 S_2O_8$ 0.02 | 50 | $(NH_4)_2 S_2O_8$ 0.03 | $S_2O_8$ | — | 28 | $72.9 \times 10^6$ |
| 16 | 50 | 450 | Mannitol 8.0 | 11.2 | $K_2S_2O_8$ 0.02 | 35 | $K_2S_2O_8$ 0.02 | 50 | $K_2S_2O_8$ 0.02 | 100 | — | 28 | $32.6 \times 10^6$ |

*71.1 g = 1 mol

Table 2

| Example No. | Acryl- amide in g | Water ml | Polymeri- sation regulator in g | pH | Initiator % by weight added | Temp- erature °C | After 6 hours Initiator % by weight added | Temp erature °C | After 20 hours Initiator % by weight added | Re- action time (hrs.) | Mole- cular weight | Notes |
|---|---|---|---|---|---|---|---|---|---|---|---|---|
| 17 | 50 | 450 | — | 2.8 | $K_2S_2O_8$ 0.02 | 50 | $K_2S_2O_8$ 0.02 | | — | 20 | $2.8 \times 10^6$ | |
| 18 | 50 | 450 | — | 10.4 | $K_2S_2O_8$ 0.03 | 50 | $K_2S_2O_8$ 0.01 | | | 21 | $7.1 \times 10^6$ | Diluted twice with 200 ml of $H_2O$ |
| 19 | 50 | 450 | — | 12.1 | $K_2S_2O_8$ 0.02 | 35 | $K_2S_2O_8$ 0.02 | 50 | — | 22 | $27.7 \times 10^6$ | Local gelling, gel fraction |
| 20 | 125 | 375 | Ethylene glycol 4.0 | 11.6 | $K_2S_2O_8$ 0.02 | 35 | $K_2S_2O_8$ 0.02 | 50 | $K_2S_2O_8$ 0.02 | 24 | $12.4 \times 10^6$ | Diluted 3 times with 100 ml of $H_2O$ |
| 21 | 200 | 300 | Ethylene glycol 6.0 | 12.4 | $K_2S_2O_8$ 0.01 | 35 | $K_2S_2O_8$ 0.02 | 50 | $K_2S_2O_8$ 0.02 | 24 | $13.8 \times 10^6$ | Diluted 4 times with 100 ml of $H_2O$ |
| 22 | 50 | 450 | Ethylene glycol 4.0 | 3.2 | $K_2S_2O_8$ 0.01 | 35 | $K_2S_2O_8$ 0.02 | 50 | $K_2S_2O_8$ 0.02 | 24 | $9.8 \times 10^6$ | |
| 23 | 50 | 450 | Ethylene glycol 4.0 | 6.8 | $K_2S_2O_8$ 0.01 | 35 | $K_2S_2O_8$ 0.02 | 50 | $K_2S_2O_8$ 0.02 | 26 | $3.3 \times 10^6$ | |
| 24 | 50 | 450 | Chloro- form 8.0 | 6.5 | $K_2S_2O_8$ 0.02 | 35 | $K_2S_2O_8$ 0.02 | 50 | — | 22 | $6.1 \times 10^6$ | |
| 25 | 50 | 450 | Oxalic acid 8.0 | 7.2 | $K_2S_2O_8$ 0.02 | 35 | $K_2S_2O_8$ 0.02 | 50 | — | 22 | $2.9 \times 10^6$ | |

Table 3

| Example No. | Acryl- amide in g | Water ml | Polymeri- sation regulator in g | pH | Initiator % by weight added | Temp- erature °C | After 6 hours Initiator % by weight added | Temp- erature °C | After 20 hours Initiator % by weight added | Re- action time hrs. | Mole- cular weight | Notes |
|---|---|---|---|---|---|---|---|---|---|---|---|---|
| 26 | 50 | 450 | Acetone 4.0 | 9.5 | $K_2S_2O_8$ 0.01 | 35 | $K_2S_2O_8$ 0.02 | 50 | $K_2S_2O_8$ 0.03 | 24 | $5.4 \times 10^6$ | |
| 27 | 50 | 450 | Methanol 6.0 | 10.2 | $K_2S_2O_8$ 0.02 | 35 | $K_2S_2O_8$ 0.02 | 50 | $K_2S_2O_8$ 0.02 | 26 | $8.7 \times 10^6$ | Gel particles |
| 28 | 50 | 450 | Ethanol 8.0 | 11.8 | $K_2S_2O_8$ 0.02 | 35 | $K_2S_2O_8$ 0.02 | 50 | — | 22 | $9.5 \times 10^6$ | Diluted once with 200 ml of $H_2O$ |
| 29 | 50 | 450 | Isopro- pyl alcohol 4.0 | 12.6 | $K_2S_2O_8$ 0.02 | 35 | $K_2S_2O_8$ 0.02 | 50 | — | 21 | $3.4 \times 10^6$ | |
| 30 | 50 | 450 | Poly- | 11.5 | $K_2S_2O_8$ 0.02 | 35 | $K_2S_2O_8$ 0.02 | 50 | $K_2S_2O_8$ | 24 | $5.7 \times 10^6$ | Gel particles |

Table 3-continued

| Example No. | Acrylamide in g | Water ml | Polymerisation regulator in g | pH | Initiator % by weight added | Temperature °C | After 6 hours Initiator % by weight added | Temperature °C | After 20 hours Initiator % by weight added | Reaction time hrs. | Molecular weight | Notes |
|---|---|---|---|---|---|---|---|---|---|---|---|---|
| | | | ethylene glycol 6.0 | | 0.01 | | 0.02 | | 0.02 | | | present |
| 31 | 50 | 450 | Polyvinyl alcohol 4.0 | 10.5 | $K_2S_2O_8$ | 35 | $K_2S_2O_8$ | 50 | — | 20 | $3.4 \times 10^6$ | |
| | | | | | 0.02 | | 0.02 | | | | | |
| 32 | 50 | 450 | Erythritol 6.0 | 10.8 | $K_2S_2O_8$ | 35 | $K_2S_2O_8$ | 50 | — | 22 | $12.4 \times 10^6$ | Diluted with twice 100 ml of $H_2O$ |
| | | | | | 0.02 | | 0.02 | | | | | |
| 33 | 50 | 450 | Malic acid 4.0 | 10.4 | $K_2S_2O_8$ | 35 | $K_2S_2O_8$ | 50 | — | 21 | $17.9 \times 10^6$ | |
| | | | | | 0.02 | | 0.02 | | | | | |
| 34 | 50 | 450 | Ascorbic acid 6.0 | 10.2 | $K_2S_2O_8$ | 35 | $K_2S_2O_8$ | 50 | — | 20 | $1.2 \times 10^6$ | Of very low viscosity |
| | | | | | 0.02 | | 0.02 | | | | | |
| 35 | 50 | 450 | Toluene 4.0 | 11.8 | $K_2S_2O_8$ | 35 | $K_2S_2O_8$ | 50 | — | 21 | $2.1 \times 10^6$ | |
| | | | | | 0.02 | | 0.02 | | | | | |
| 36 | 50 | 450 | Xylene 6.0 | 12.5 | $K_2S_2O_8$ | 35 | $K_2S_2O_8$ | 50 | $K_2S_2O_8$ 0.02 | 24 | $3.2 \times 10^6$ | |
| | | | | | 0.01 | | 0.03 | | | | | |
| 37 | 50 | 450 | Urea 6.0 | 11.2 | $K_2S_2O_8$ | 35 | $K_2S_2O_8$ | 50 | — | 21 | $1.6 \times 10^6$ | Of very low viscosity |
| | | | | | 0.02 | | 0.02 | | | | | |
| 38 | 50 | 450 | Ethyl acetate 6.0 | 11.2 | $K_2S_2O_8$ | 35 | $K_2S_2O_8$ | 50 | — | 20 | $2.7 \times 10^6$ | |
| | | | | | 0.02 | | 0.03 | | | | | |
| 39 | 50 | 450 | Ethylene glycol diacetate 8.0 | 11.2 | $K_2S_2O_8$ | 35 | $K_2S_2O_8$ | 50 | — | 20 | $3.9 \times 10^6$ | |
| | | | | | 0.02 | | 0.02 | | | | | |

Table 4

| Examples | Corresponding to examples from Table 1 (or the commercial products): | % by weight added* | Height of the clear zone above the settling kaolin turbidity, in mm | | | | | Clarity of the water above the flocculated kaolin | Nature of the flocks |
|---|---|---|---|---|---|---|---|---|---|
| | | | 15 | 30 | 60 | 120 | 180 sec. | | |
| 1 | Example 2 | 0.01 | 75 | 150 | 300 | 365 | 375 | clear | coarse |
| | MW** = $80.7 \times 10^6$ | 0.04 | 300 | 385 | 410 | 425 | 430 | clear | coarse |
| 2 | Example 5 | 0.01 | 100 | 175 | 320 | 375 | 385 | clear | coarse |
| | MW = $94.7 \times 10^6$ | 0.04 | 340 | 395 | 420 | 435 | 440 | clear | coarse |
| 3 | Example 8 | 0.01 | 40 | 160 | 230 | 330 | 350 | slightly turbid | medium-coarse |
| | MW = $58.6 \times 10^6$ | 0.04 | 300 | 370 | 390 | 410 | 420 | clear | coarse |
| 4 | Praestol 3000 | 0.01 | 30 | 75 | 175 | 300 | 340 | turbid | medium-coarse |
| | Mw = approx. $12 \times 10^6$ | 0.04 | 200 | 335 | 375 | 395 | 405 | clear | almost coarse |
| 5 | Sedipur TF 5 | 0.01 | 40 | 85 | 165 | 280 | 320 | turbid | medium-fine |
| | MW = approx. $10 \times 10^6$ | 0.04 | 150 | 300 | 360 | 390 | 400 | almost clear | almost coarse |

*The % by weight addition of the flocculating agent to the kaolin suspension is based on the kaolin
**MW = molecular weight Table 5

| | | Acceleration of drainage measured by the increase in freeness in °SR | | | | | |
|---|---|---|---|---|---|---|---|
| Examples | Corresponding to example, from Tables 1 and 3, numbers: | For the paper pulp suspension which contains 10% of kaolin, at pH = 4.8 with the addition[1] of products according to the invention, commercially available products or comparison products from the indicated examples at | | | | | For the paper pulp suspension which contains 10% of kaolin, at pH = 4.8 without the addition of auxiliaries (0 samples) (blank tests) |
| | | 0.05 | 0.10 | 0.20 | 0.30 | % by weight | |
| 1 | 1 | 41 | 31 | 26 | 24 | | 54 |
| 2 | 2 | 48 | 42 | 34 | 26 | | 57 |
| 3 | 7 | 52 | 45 | 38 | 25 | | 55 |
| 4 | 8 | 40 | 32 | 24 | 18 | | 55 |
| 5 | 12 | 35 | 25 | 24 | 25 | | 55 |
| 6 | 13 | 38 | 32 | 26 | 23 | | 57 |
| 7 | 16 | 32 | 25 | 22 | 21 | | 55 |
| 8 | 31 | 52 | 47 | 43 | 38 | | 55 |
| 9 | 33 | 51 | 45 | 41 | 36 | | 57 |
| 10 | Sursolan A2P* | 47 | 39 | 32 | 30 | | 56 |
| 11 | Praestol 2830* | 51 | 46 | 41 | 37 | | 56 |

*Comparison examples with the commercially available products Sursolan A2P and Praestol 2830
[1]In % by weight based on the solids suspension The following can be seen from the tables given above:

If, as in Example 2, the amount of polymerisation regulator is increased and, at the same time, a potassium persulphate is selected instead of ammonium persulphate as the initiator, the molecular weight increases from 44.2 million to 80.7 million, the other process conditions otherwise being identical except for the differences in the amount of dilution. However, when the amount of polymerisation regulator is further increased from 2.0 g up to 12.0 g, the increase achieved in the molecular weight is only from 80.7 million up to 94.7 million. A completely surprising but reproducible finding which then follows is the evidence, which can be seen from Example 6, that it is no longer possible to obtain products according to the invention when an amount of polymerisation regulator of at most 20 g per mol of acrylamide is exceeded. Example 6 shows that when the amount of polymerisation regulator is 28.4 g per mol of acrylamide the molecular weight falls rapidly from the former value of 94.7 million to 2.2 million. Examples 7 to 16 then show that particularly good acrylamide polymers, according to the invention, which have extremely high molecular weights are also obtained . . . a series of further polymerisation regulators and initiators, which are further varied by changing the amounts of diluent and in some cases by adding the initiator in four steps.

The comparison experiments summarised in Table 2 do indeed all start without exception from homogeneous acrylamide monomers and the addition of initiator is also made in the most appropriate manner, in some cases even in steps, according to the invention; other process criteria, such as, in particular, the pH of the reaction mixture of the reaction mixture were varied.

The following may be stated with regard to the individual experiments:

Example 17 shows that instead of the pH being adjusted to a range of 8 to 13, according to the invention, a pH range of 2.8 has been selected and, moreover, a polymerisation regulator is not present so that the resulting molecular weight is only 2.8 million.

It can be seen from Example 18 that even if the reaction mixture is correctly set with regard to the pH, the resulting molecular weight is not more than 7.1 million because of the lack of a polymerisation regulater and the fact that the initiator was added in only two steps.

If the pH is further increased to 12.1 and the same amounts of initiator are added to the reaction mixture using a two-step addition of initiator, the resulting auxiliary agent does indeed already have a molecular weight of 27.7 million (Example 19) but the product already shows partial local gelling after eight hours because, in contrast to the preceding example, the reaction mixture is not diluted with water, so that the finished auxiliary agent can be employed for the abovementioned applications in only a very restricted way because of the water-insoluble gel particles contained therein.

It can be seen from the next comparison Example 20 that even with the use of a polymerisation regulator according to the invention, at a preferred pH, with three-step addition of an appropriate initiator, with temperature control within the advantageous limits, with an adequate reaction time and with three dilutions with water, the resulting molecular weight of the finished auxiliary agent is only 12.4 million because the amount of acrylamide employed has been increased from 50 g to 125 g.

The effect, which in itself is completely unexpected, shown by the abovementioned example, has been confirmed again by the subsequent comparison Example 21, which showed that even when the amount of acrylamide was further increased and otherwise optimum conditions were maintained it was again possible only to achieve a molecular weight of 13.8 million.

The information which can be drawn by those skilled in the art from the further comparison Examples 22, 23, 24 and 25 is that, when the other conditions at the start of the process and when carrying out the process are optimum, only relatively low molecular weights of 9.8, 3.3, 6.1 and 2.9 million are obtained if the hydrogen ion concentration in the reaction solution is so adjusted that an acid to neutral pH of 3.2, 6.8, 6.5 and 7.2 results. Evaulation of the results given in Table 3:

In comparison Examples 26 to 39 inclusive, which are summarised in this table, it is shown that when the starting conditions and reaction conditions are otherwise optimum and also when the optimum amounts of initiator are added, although these amounts are mainly added in only two steps, auxiliary agents which, relatively, have only a very low molecular weight and, in addition, exhibit adverse partial enrichment of gel particles are obtained because there has been a qualitative change in only one component, that is to say substances which are not according to the invention have been selected as polymerisation regulators. In these examples the polymerisation regulators ethanol, isopropyl alcohol and polyethylene glycol have been employed in accordance with the recommendations of U.S. Pat. No. 2,820,777, whilst polyvinyl alcohol has been used in accordance with the recommendation of DT-AS (German Published Specification No.) 2,243,155. It was not possible in any of these cases to achieve a molecular weight of 30 million, which is to be regarded as a lower limit for a corresponding auxiliary-agent which has an optimum capacity in fields of application covering a large number of sectors. The extent to which the disadvantages of such low molecular weights are evident when auxiliary-agents of this type are used in practice can be seen from the test, which is discussed further below, to determine the acceleration of drainage, according to Table 5, with the aid of various selected substances, which also include the comparison substances from the abovementioned Examples 31 and 33.

When the flocculating results, which can be seen from Table 4, are compared it is first of all clear that the flocculating capacity of the particular auxiliary also increases as its molecular weight increases. In detail, the improvements can clearly be discerned in the form of the following criteria:

(a) an increase in the rate of settling of the flocculated kaolin suspension;

(b) an improvement, as a result of more thorough flocculation of the kaolin, in the clarity of the water which remains above the substance which has settled; and (c) the formation of more voluminous flocks.

This improvement in the drainage capacity of suspensions with the aid of auxiliary-agents according to the invention, such as those which can be seen in Table 4, where, for reasons of space, only selected examples are given with the aid of the Examples, according to the invention, 2, 5 and 8 which can be seen in Table 1, is in contrast to the considerably poorer capacities, according to comparison Examples 4 and 5 which can be seen in Table 4, of commercially available products which are already known and are on the market.

In places where a capacity which is better than that of the substances known hitherto is not required, those skilled in the art can also utilise the substantial improvement in the capacity of the products according to the invention, which is clearly evident from the above, in another economically advantageous manner since the auxiliary agents according to the invention provide a possibility for using these in lower concentrations and thus for achieving considerable savings in costs.

A comparison of the drainage acceleration values by freeness increase according to Table 5 also clearly shows the considerably better capacities of the auxiliary agents according to the invention (Examples 1 to 7); the corresponding capacities according to comparison Examples 8 to 11 are, in contrast, considerably less favourable. Example 8 from Table 5 shows the use of a comparison substance, the preparation of which can be seen from Example 31 in Table 3. Correspondingly, Example 9 in this Table 5 shows the use of another comparison substance, the preparation of which is described in Example 33 of the preceding Table 3. Examples 10 and 11 of Table 5 show the use of two commercially available products which are obtainable on the market.

With regard to the actual results, according to Table 5, obtained for the acceleration of drainage, it can be stated that the acceleration of drainage is greater, for all the concentrations in which additions were made, when the auxiliary agents according to the invention are emplyed than when the comparison products are used. Although it can be seen, on the one hand, that the addition of 0.3% by weight of the comparison products according to Examples 8, 9, 10 and 11 already shows considerable improvements with regard to the acceleration of drainage, compared with those paper pulp suspensions to which no auxiliary agent whatsoever has been added, since the values fall from an average of 55 to 57 down to values of 30 to 38, it is, on the other hand, however, also clearly to be seen from Table 5 that the products according to the invention, according to Examples 4, 5, 6 and 7 in Table 5, exhibit favourable values, in this range, of 32, 35, 38 and 40 respectively when only one-sixth the amount of the auxiliary agent according to the invention is added. In other words a capacity for the acceleration of drainage which is equal to that obtained with the auxiliary agents according to the invention can be achieved with the comparison products and with the commercially available substances only if six times the amount of these substances is added to the paper pulp suspension.

This considerable technical advance, which results from the above, was the more unexpected since the use of the polymerisation regulators employed for the preparation of these auxiliary agents in no way appeared to be obvious, with regard to their capacity, from the state of the art disclosed hitherto; on the contrary, substances which frequently were chemically very closely related to these regulators surprisingly scarcely exhibited a corresponding efficiency when they were used for the preparation of auxiliary agents which have such extremly high molecular weights and, at the same time, are outstandingly readily soluble in water, as can clearly be seen from the comparison examples in the tables given above.

In addition to the distinct improvement, which can be seen from the given Table 5, in the acceleration of the drainage of paper pulp suspensions filled with kaolin when the auxiliary agents according to the invention are employed, it is, in addition, also evident that the retention of the added kaolin is also improved. This has been confirmed from the effluents after drainage in the freeness test equipment. Moreover, it can also be concluded indirectly from the results of the flocculating experiments according to Table 4 that there is an increase in retention and, therefore, no further specific mention of the direct improvement in retention is made at this point.

The auxiliary agent, according to the invention, for improving the retention of flushable solids and for accelerating the drainage of suspensions, for the more rapid treatment of solid and liquid substances which can be utilised industrially, such as industrial water, effluents and sludges, mainly in the paper industry, and for improving the structure of soils can, as far as is known hitherto, of course be employed within these fields of use as well as in other fields, giving surprisingly diverse possibilities for use. In the case of sludge treatment, for example, both the treatment of raw sludge and that of activated sludge can be substantially improved by the addition of the auxiliary agents according to the invention. However, the abovementioned auxiliary agents can also be employed equally successfully in sludge thickening and sludge flotation processes.

The fact that these auxiliary agents are not affected by the addition of very diverse other substances, for example in the clarification process, is a considerable advantage. It is therefore possible without hesitation to add inorganic flocculating agents, such as, for example, those based on aluminium salts and/or iron salts or those based on lime compounds, without the auxiliary agent according to the invention being adversely affected by this.

The problems arising in any given case, also including, moreover, those in the conditioning of effluent sludges, the drainage of dry gels or the centrifuging of sludges, can be solved easily by the addition of the abovementioned auxiliary agents according to the invention. The sludge obtained is stabilised by the use of the auxiliary agents according to the invention to the extent that the auxiliary agents promote the formation of flocks which are resistant to breaking up.

Depending on the choice of the process which is required in order to solve the various problems which arise, it is, of course, possible when using the auxiliary agents according to the invention, for example in the field of papermaking, not to add the other substances required for this purpose, such as, for example, dyestuffs, antioxidants, optical brighteners and fluorescent agents, separately to the paper but already to mix these substances, before they are added, with the auxiliary agent according to the invention, since the auxiliary agent is also not sensitive to these substances. The abovementioned process is sometimes favoured in the paper industry because, in general, optical brighteners and fluorescent agents, for example, are required in only small amounts in the paper in order to achieve the desired change in the appearance of the paper.

Moreover, the auxiliary agent according to the invention can also be employed advantageously in the field of papermaking as an agent to improve the shear stability, for example in pumps, oscillating screens and other equipment used in the papermaking process.

Since the abovementioned auxiliary agent according to the invention is composed only of recurring structural units of acrylamide and is thus a homopolymer, auxiliary agents which are considered to be copolymers of acrylamide are not claimed within the scope of this invention. Examples of comonomers of acrylamide from which it is possible, utilising the process according to the invention, which is as described above, in an optimum manner to prepare and employ auxiliary agents which can be used successfully in the abovementioned fields, are the following compounds, which are to be selected from an appropriate group: acrylic acid, methacrylic acid, maleic acid, fumaric acid, itaconic acid, vinylsulphonic acid, sodium acrylate, sodium methacrylate, sodium maleate, sodium fumarate, sodium itaconate, sodium vinylsulphonate, ammonium acrylate, ammonium methacrylate, ammonium maleate, ammonium fumarate, ammonium itaconate, ammonium vinylsulphonate, 2-dimethylaminoethyl acrylate, 2-dimethylaminomethyl acrylate, 2-methacryloyl-oxyethyl-trimethylammonium chloride, acrylic acid aryl esters, t-butylaminoethyl methacrylate, 2-hydroxy-3-methacryloyl-oxypropyl-trimethylammonium chloride, 2-methacryloyl-oxyethyl-trimethylammonium methylsulphate, 2-vinylpyridine and also vinylpyridinium salts, N-substituted (N-dialkylaminoalkyl)-acrylamides, diallyldimethylammonium chloride, diallylamine, diallylethylamine, allylamine, allyltrimethylammonium bromide, N-vinyldimethylaminopropylacetamide, vinylbenzyltrimethylammonium chloride, N-vinyllactams, N-vinylpyrrolidone, vinylcaprolactam, vinylimidoazole and its derivatives, acrylic acid alkyl esters, methacrylic acid alkyl esters, hydroxyalkyl esters, glycol monoacrylate, butanediol monoacrylate, styrene, chlorostyrene, chloromethylstyrene, vinyl methyl ether and its higher homologues, acrylonitrile and other suitable comonomers.

Since most of the abovementioned comonomers are readily obtainable industrially and commercially, those skilled in the art have a free choice and can polymerise any desired comonomers of this type to give corresponding auxiliary agents; however, as stated above, this is not a subject of this patent application.

What we claim is:

1. A high-molecular weight, water-soluble homopolymer of acrylamide obtained by aqueous solution polymerization of acrylamide monomer in an amount of 3 20% by weight of monomer based on the total solution, at a pH value of 8 to 13 and with the addition of radical initiators in at least three steps at intervals during the polymerization, said initiators being added in a total amount of 0.02 to 1.0% by weight based on the amount of monomer and with the addition of polymerization regulators in an amount of at most 20 g per mol of monomer said regulators being at least one member selected from the group consisting of alkylene glycols, aliphatic dicarboxylic acids, lower aliphatic chlorinated hydrocarbons, acetic acid, metal acetates, citric acid, glycerol, mannitol, taurine and tetrahydrofuran, said homopolymer of acrylamide being in the form of a storage stable homopolymer which has a molecular weight of 30.6 to 98.5 million.

2. The acrylamide polymer of claim 1 having a molecular weight of 32.6 to 98.5 million.

3. A process for preparing the homopolymer of acrylamide of claim 1, comprising the steps:
   a. preparing an aqueous solution comprising 5 to 20% by weight of acrylamide based on solution weight;
   b. adding a polymerization regulator to the solution in an amount of 1 to 28% by weight, based on acrylamide monomer, said regulator being at least one member selected from the group consisting of alkylene glycols, aliphatic dicarboxylic acids, lower aliphatic chlorinated hydrocarbons, acetic acid, metal acetates, citric acid, glycerol, mannitol, taurine and tetrahydrofuran;
   c. adjusting the solution pH to about 8 to 13;
   d. flushing the reaction vessel with an inert gas and adjusting the temperature of the reaction mixture to about 10° to 40° C;
   e. adding one to four free radical initiators in an amount of 0.008 to 0.03% by weight, based on acrylamide monomer;
   f. reacting the resulting mixture at temperatures of 10° to 40° C for four to twelve hours;
   g. raising the reaction temperature to about 25° to 60° C;
   h. adding one to four free radical initiators in an amount of 0.01 to 0.035% by weight, based on acrylamide monomer;
   i. reacting the resulting mixture at temperatures of 25° to 60° C for ten to eighteen hours;
   j. adding a free radical initiator in an amount of 0.01 to 0.035% by weight, based on acrylamide monomer;
   k. reacting the resulting mixture at a temperature of 25° to 60° C for four to eight hours;
   l. in the event the residual monomer content is more than about 2% based on converted acrylamide monomer, then adding a free radical initiator in an amount of 0.02 to 0.05 by weight, based on acrylamide monomer, and further heating the reaction mixture at a temperature of about 25° to 60° C for about four to eight hours.

4. A process for preparing the homopolymer of acrylamide of claim 1, comprising the steps:
   a. preparing an aqueous solution comprising 8 to 15% by weight acrylamide monomer based on solution weight;
   b. adding a polymerization regulator in an amount of 2.8 to 24% by weight, based on acrylamide monomer, said regulator being at least one member selected from the group consisting of alkylene glycols, aliphatic dicarboxylic acids, lower aliphatic chlorinated hydrocarbons, acetic acid, metal acetates, citric acid, glycerol, mannitol, taurine and tetrahydrofuran;
   c. Adjusting the solution pH to about 10 to 12.5;
   d. flushing the reaction vessel with an inert gas and adjusting the temperature of the reaction mixture to about 20° to 35° C;
   e. adding one to three free radical initiators in an amount of 0.01 to 0.02% by weight, based on acrylamide monomer;
   f. reacting the resulting mixture at a temperature of 20° to 35° C for 5 to 8 hours;
   g. raising the reaction temperature to about 30° to 55° C;
   h. adding one to three free radical initiators in an amount of 0.01 to 0.03 by weight, based on acrylamide monomer;
   i. reacting the resulting mixture at a temperature of 30° to 55° C for 12 to 15 hours;
   j. adding a free radical initiator in an amount of 0.01 to 0.03% by weight, based on acrylamide monomer;
   k. reacting the resulting mixture at a temperature of 30° to 55° C for five to seven hours;
   l. in the event the residual monomer content is more than about 2% based on converted acrylamide monomer, then adding a free radical initiator in the amount of 0.02 to 0.03% by weight, based on acrylamide monomer and further heating the reaction mixture at a temperature of about 30° to 55° C for about 5 to 7 hours.

5. The process of claim 3 wherein polymerization is regulated by at least one member selected from the group consisting of ethylene glycol, propylene glycol, oxalic acid, succinic acid, chloroform, carbon tetrachloride and zinc acetate.

6. The process of claim 4 wherein polymerization is regulated by at least one member selected from the group consisting of ethylene glycol, propylene glycol, oxalic acid, succinic acid, chloroform, carbon tetrachloride and zinc acetate.

* * * * *